United States Patent
Deng et al.

(10) Patent No.: US 10,284,693 B2
(45) Date of Patent: May 7, 2019

(54) REMOTE CONTROLLER

(71) Applicant: SZ DJI TECHNOLOGY CO., LTD., Shenzhen (CN)

(72) Inventors: Yumian Deng, Shenzhen (CN); Bo Yuan, Shenzhen (CN); Zhenkai Wu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/053,294

(22) Filed: Aug. 2, 2018

(65) Prior Publication Data
US 2018/0375977 A1    Dec. 27, 2018

Related U.S. Application Data

(63) Continuation of application No. PCT/CN2016/079463, filed on Apr. 15, 2016.

(51) Int. Cl.
*H04M 1/00* (2006.01)
*H04M 1/02* (2006.01)

(52) U.S. Cl.
CPC ....... *H04M 1/0239* (2013.01); *H04M 1/0214* (2013.01); *H04M 1/0247* (2013.01); *H04M 1/0254* (2013.01)

(58) Field of Classification Search
CPC ............. H04M 1/0239; H04M 1/0214; H04M 1/0247; H04M 1/0254
USPC ............ 455/575.4, 575.3, 575.1, 550.1, 90.3
See application file for complete search history.

(56) References Cited

U.S. PATENT DOCUMENTS

| | | | | |
|---|---|---|---|---|
| 7,466,444 | B2* | 12/2008 | Silverbrook | B41J 3/445 347/109 |
| 8,297,087 | B1* | 10/2012 | Lin | E05B 37/0058 70/26 |
| 8,380,265 | B2* | 2/2013 | Kim | G06F 1/1626 455/575.1 |
| 8,934,226 | B2* | 1/2015 | Smith | G06F 1/1613 361/679.2 |

(Continued)

FOREIGN PATENT DOCUMENTS

| | | |
|---|---|---|
| CN | 202735962 U | 2/2013 |
| CN | 103961871 A | 8/2014 |

(Continued)

OTHER PUBLICATIONS

The World Intellectual Property Organization (WIPO) International Search Report for PCT/CN2016/079463 dated Dec. 28, 2016 7 Pages (including translation).

*Primary Examiner* — Marceau Milord
(74) *Attorney, Agent, or Firm* — Anova Law Group, PLLC

(57) ABSTRACT

A remote controller includes a remote controller body including one or more control devices, a holding mechanism configured to move with respect to the remote controller body to switch between an extended state and a contracted state, a connecting mechanism movably connecting the holding mechanism to the remote controller body, and an antenna provided at a side of the remote controller body and rotatably connected to the remote controller body to be extended or folded. The holding mechanism includes a handle connected to the connecting mechanism. The handle is located outside the remote controller body in the extended state. The remote controller is configured to control an unmanned aerial vehicle (UAV).

27 Claims, 17 Drawing Sheets

(56) References Cited

U.S. PATENT DOCUMENTS

| | | | |
|---|---|---|---|
| 8,965,460 B1* | 2/2015 | Rao | G06F 3/005 |
| | | | 455/566 |
| 9,056,676 B1* | 6/2015 | Wang | B64F 1/00 |
| 9,562,369 B2* | 2/2017 | Kuo | E05B 37/0048 |
| 9,975,644 B1* | 5/2018 | Kimchi | B64D 35/04 |
| 9,979,427 B2* | 5/2018 | Thomas | H05K 9/0069 |
| 2008/0285151 A1* | 11/2008 | Huang | H01H 25/06 |
| | | | 359/702 |
| 2009/0286580 A1 | 11/2009 | Murakoso et al. | |
| 2014/0131510 A1* | 5/2014 | Wang | B64C 39/024 |
| | | | 244/17.23 |
| 2014/0267775 A1* | 9/2014 | Lablans | H04N 5/247 |
| | | | 348/169 |
| 2014/0364232 A1 | 12/2014 | Cramer et al. | |
| 2015/0314434 A1* | 11/2015 | Bevins, Jr. | B23D 59/001 |
| | | | 30/514 |
| 2016/0102475 A1* | 4/2016 | Kuo | E05B 37/0048 |
| | | | 70/315 |
| 2016/0198088 A1* | 7/2016 | Wang | H04N 5/23238 |
| | | | 348/36 |
| 2017/0043862 A1* | 2/2017 | Lippincott | B64C 13/50 |
| 2017/0061813 A1* | 3/2017 | Tao | G09B 9/08 |
| 2017/0205821 A1* | 7/2017 | Peng | G05G 21/00 |
| 2017/0262009 A1* | 9/2017 | Peng | G05G 1/01 |

FOREIGN PATENT DOCUMENTS

| | | |
|---|---|---|
| CN | 204017384 U | 12/2014 |
| CN | 204213563 U | 3/2015 |
| CN | 204374658 U | 6/2015 |
| CN | 104801041 A | 7/2015 |
| CN | 105006132 A | 10/2015 |
| CN | 105056526 A | 11/2015 |
| CN | 105096570 A | 11/2015 |
| CN | 105101702 A | 11/2015 |
| CN | 204962224 U | 1/2016 |
| CN | 205665860 U | 10/2016 |
| JP | 2002123353 A | 4/2002 |

* cited by examiner

100

100

200

200

REMOTE CONTROLLER

CROSS-REFERENCE TO RELATED APPLICATION

This application is a continuation application of International Application No. PCT/CN2016/079463, filed on Apr. 15, 2016, the entire contents of which are incorporated herein by reference.

TECHNICAL FIELD

The present disclosure relates to remote control technology and, more particularly, to a remote controller and a manufacturing method thereof.

BACKGROUND

With the popularity of the aerial photography function of unmanned aerial vehicles (UAVs), more and more UAVs need to use a mobile phone as a smart terminal for remote control of the aerial photography.

In conventional technologies, the remote controller of the UAV includes a remote controller body. A mobile phone holding device is provided at the remote controller body and is configured to hold the mobile phone, such that the user can use the mobile phone to remotely control the UAV for performing the aerial photography.

The mobile phone holding device provided at the remote controller occupies a large space, such that the space occupied by the remote controller is expanded and the portability of the remote controller is reduced.

SUMMARY

In accordance with the disclosure, there is provided a remote controller includes a remote controller body including one or more control devices, a holding mechanism configured to move with respect to the remote controller body to switch between an extended state and a contracted state, a connecting mechanism movably connecting the holding mechanism to the remote controller body, and an antenna provided at a side of the remote controller body and rotatably connected to the remote controller body to be extended or folded. The holding mechanism includes a handle connected to the connecting mechanism and located outside the remote controller body in the extended state. The remote controller is configured to control an unmanned aerial vehicle (UAV).

DESCRIPTION OF MAIN COMPONENTS AND REFERENCE NUMERALS

Figure 1:
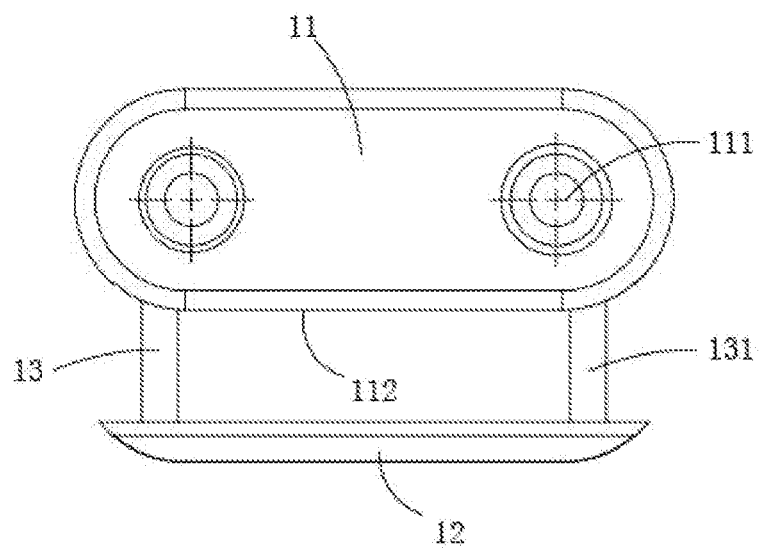
FIG. 1 is a schematic structural diagram of an exemplary remote controller.

Remote controller body 11
Control device 111
Receiving component 112
One-hand grip 113
Display screen 114
Antenna 115
Anti-collision groove 1151
Engaging component 1152
Mating component 1153
Middle function button 116
Upper function button 117
Upper-edge function button 118
Lock button 119
Holding mechanism 12
Handle 121
Slot 122
Anti-slip component 1221
Connecting mechanism 13
Sliding component 131
Rotating rod 132
First rotating shaft 1321
Second rotating shaft 1322
Mobile terminal 21

DETAILED DESCRIPTION OF THE EMBODIMENTS

Exemplary embodiments will be described with reference to the accompanying drawings. In the situation where the technical solutions described in the embodiments are not conflicting, they can be combined.

Figure 2:
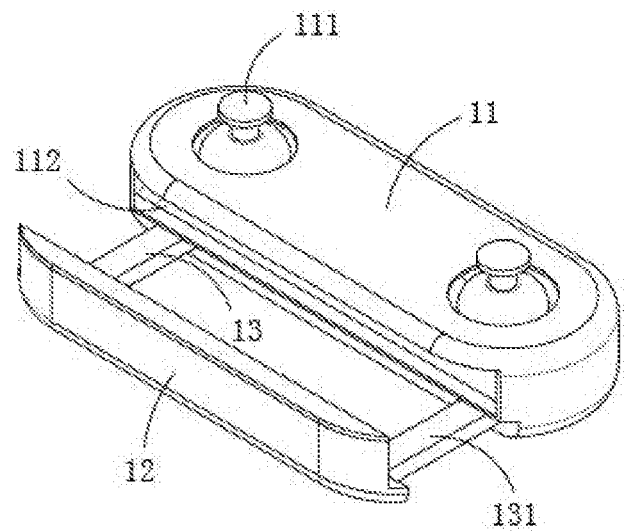
FIG. 2 is a perspective view of the exemplary remote controller.

FIG. 1 is a schematic structural diagram of an exemplary remote controller 100 consistent with the disclosure. FIG. 2 is a perspective view of the remote controller 100.

As shown in FIGS. 1 and 2, the remote controller 100 includes a remote controller body 11, a holding mechanism 12, and a connecting mechanism 13. The remote controller body 11 is provided with a control device 111 for a user to input a remote-control command. The holding mechanism 12 is configured to hold a mobile terminal 21. The connecting mechanism 13 is connected between the remote controller body 11 and the holding mechanism 12.

Figure 3:
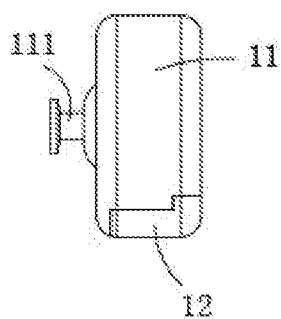
FIG. 3 is a side view of the exemplary remote controller when a holding mechanism is in a contracted state.
Figure 4:
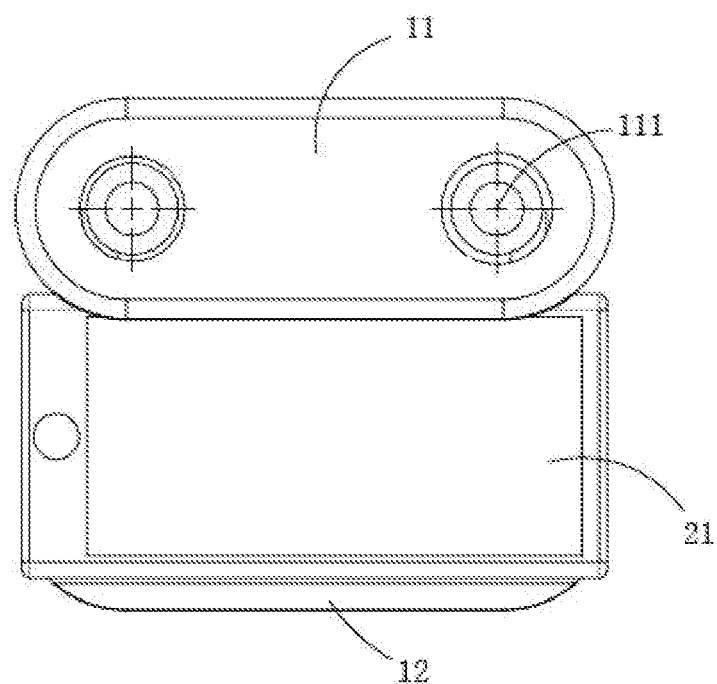
FIG. 4 is a front view of the exemplary remote controller when being connected to a mobile terminal.
Figure 5:
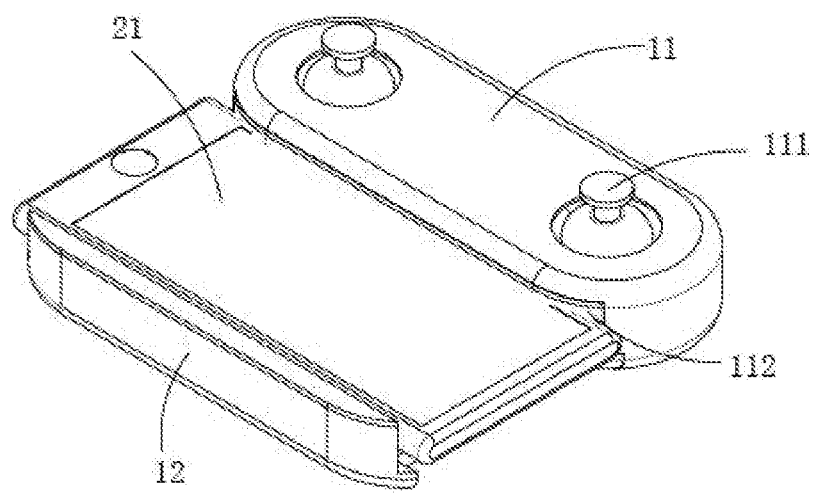
FIG. 5 is a perspective view of the exemplary remote controller when being connected to the mobile terminal.

FIG. 3 is a side view of the remote controller 100 when the holding mechanism 12 is in a contracted state. FIG. 4 is a front view of the remote controller 100 when being connected to the mobile terminal 21. FIG. 5 is a perspective view of the remote controller 100 when being connected to the mobile terminal 21.

The holding mechanism 12 is movably connected to the remote controller body 11 via the connecting mechanism 13. The holding mechanism 12 can move with respect to the remote controller body 11, such that the holding mechanism 12 is either in an extended state for holding the mobile terminal 21, as shown in, e.g., FIG. 4, or in a contracted state that is convenient for carrying the remote controller 100, as shown in, e.g., FIG. 3.

In the embodiment, when the remote controller 100 is in use, the user can move the holding mechanism 12 with respect to the remote controller body 11 to cause the holding mechanism 12 to be in the extended state, such that the mobile terminal 21 can be held on the holding mechanism 12 to facilitate an auxiliary remote-control operation via the mobile terminal 21. After the remote-control operation is completed, the user can detach the mobile terminal 21 from the holding mechanism 12, and move the holding mechanism 12 with respect to the remote controller body 11 to cause the holding mechanism 12 to be in the contracted state, thereby reducing the space occupied by the remote controller 100 and improving the portability of the remote controller 100.

In some embodiments, as shown in FIGS. 1 to 5, the holding mechanism 12 can be slidably connected to the remote controller body 11 via the connecting mechanism 13. As shown in FIGS. 2 and 3, a distance between the remote controller body 11 and the holding mechanism 12 in the extended state is greater than the distance between the remote controller body 11 and the holding mechanism 12 in the contracted state. The user can slide the holding mechanism 12 with respect to the remote controller body 11 to cause the holding mechanism 12 to be in the extended state, such that the mobile terminal 21 can be held on the holding mechanism 12 to facilitate the auxiliary remote-control operation via the mobile terminal 21. After the remote-control operation is completed, the user can detach the mobile terminal 21 from the holding mechanism 12, and slide the holding mechanism 12 with respect to the remote controller body 11 to cause the holding mechanism 12 to be in the contracted state, thereby facilitating the reduction of the occupied space of the remote controller 100 and improving the portability of the remote controller 100. Therefore, the extend or contract operation of the holding mechanism 12 can be facilitated. Because the distance between the remote controller body 11 and the holding mechanism 12 in the extended state can be greater than the distance between the remote controller body 11 and the holding mechanism 12 in the contracted state, the mobile terminal 21 can be easily held on the holding mechanism 12 in the extended state.

In some embodiments, as shown in FIGS. 4 and 5, the remote controller body 11 includes a front and a plurality of sides connected to the front. One of the sides is a bottom side of the remote controller 100 near the user, when the remote controller 100 is in a use state. The control device 111 is provided at the front of the remote controller body 11. The holding mechanism 12 holds the mobile terminal 21 at a position close to the bottom side. Because the bottom side is close to the user when the remote controller 100 is in the use state and the holding mechanism 12 can hold the mobile terminal 21 near to the bottom side, such that the mobile terminal 21 can be close to the user when the remote controller 100 is in the use state, thereby facilitating the user to operate the mobile terminal 21.

In some embodiments, as shown in FIG. 3, the holding mechanism 12 abuts against the bottom side in the contracted state. As such, the holding mechanism 12 can be in contact with the bottom side in the contracted state, which further reduces the space occupied by the remote controller 100 and improves the portability of the remote controller 100. In addition, the bottom side can also support the holding mechanism 12, thereby improving the stability of the holding mechanism 12 in the contracted state. In some embodiments, the holding mechanism 12 may also abut against the front or other sides of the remote controller body 11 in the contracted state.

In some embodiments, as shown in, e.g., FIG. 4, when the holding mechanism 12 is in the extended state, the mobile terminal 21 abuts against the bottom side. In some other embodiments, when the holding mechanism 12 is in the extended state, the holding mechanism 12 can hold the mobile terminal 21 above or below the front. As such, the bottom side or the front of the remote controller body 11 can support the mobile terminal 21, thereby improving the stability of the mobile terminal 21.

In some embodiments, the holding mechanism 12 can hold the mobile terminal 21 at a position close to the control device 111. As such, a distance between the mobile terminal 21 and the control device 111 can be relatively close, thereby reducing a distance by which the user's hand moves between the control device 111 and the mobile terminal 21, which facilitates the user to perform a switching operation between the control device 111 and the mobile terminal 21.

In some embodiments, as shown in, e.g., FIGS. 1 and 5, the remote controller body 11 includes a receiving component 112. The holding mechanism 12 can be located at least partially inside the receiving component 112 in the contracted state. The holding mechanism 12 can protrude from the receiving component 112 in the extended state. Because the holding mechanism 12 can be located at least partially inside the receiving component 112 in the contracted state, the space occupied by the remote controller 100 can be further reduced, and the portability of the remote controller 100 can be improved.

In some embodiments, the connecting mechanism 13 can be provided inside the receiving component 112. As such, the connecting mechanism 13 does not occupy the external space of the remote controller body 11, thereby further reducing the space occupied of the remote controller 100, improving the portability of the remote controller 100, and enhancing the overall appearance of the remote controller 100. In some other embodiments, the connecting mechanism 13 can be also provided outside the receiving component 112.

In some embodiments, as shown in, e.g., FIGS. 1 and 2, the connecting mechanism 13 includes a sliding component 131. The sliding component 131 is fixedly connected to the holding mechanism 12 and is slidingly connected to the remote controller body 11. Therefore, through a relative sliding between the sliding component 131 and the remote controller body 11, the holding mechanism 12 can be driven to slide relative to the remote controller body 11, such that the reliability of the sliding of the holding mechanism 12 can be improved.

In some embodiments, the sliding component 131 can include a slide bar and the slide bar can be provided in the receiving component 112. The slide bar can slide inside the receiving component 112 to cause the holding mechanism 12 to be closer to or away from the receiving component 112. As such, the structure of the connecting mechanism 13 can be simple and the use of the connecting mechanism 13 can be reliable.

In some embodiments, the holding mechanism 12 can be received inside the receiving component 112 in the contracted state. As such, the size of the remote controller 100 can be further reduced, the portability of the remote controller 100 can be improved, and the overall appearance of the remote controller 110 can be enhanced.

In some embodiments, as shown in, e.g., FIGS. 4 and 5, the holding mechanism 12 is configured to abut against a side of the mobile terminal 21, such that the mobile terminal 21 can be held between the holding mechanism 12 and a side of the remote controller body 11 where the receiving component 112 is located. As such, the holding of the mobile terminal 21 can be more reliable.

In some embodiments, as shown in, e.g., FIGS. 4 and 5, an outer side of an opening edge of the receiving component 112 is configured to abut against the other side of the mobile terminal 21. As such, the holding of the mobile terminal 21 can be more reliable.

In some embodiments, the connecting mechanism 13 can also include a guide component that cooperates with the sliding component 131, such that the sliding component 131 can be slide along a preset direction. Therefore, the reliability of the sliding of the holding mechanism 12 can be further improved.

In some embodiments, the guide component can include a guide groove or a guide rail provided in the receiving component 112. As such, the structure of the guide component can be simple and the use of the guide component can be reliable.

Figure 6:
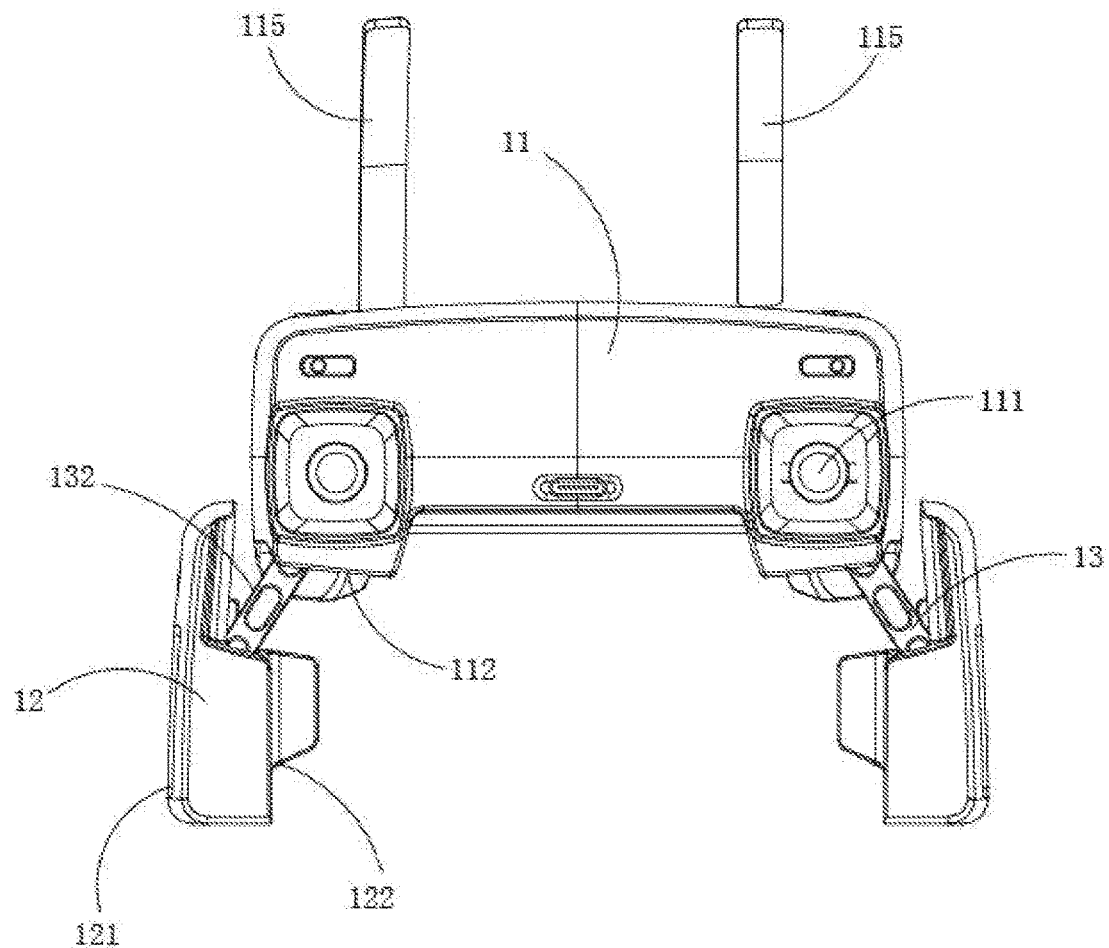
FIG. 6 is a schematic structural diagram of another exemplary remote controller.
Figure 7:
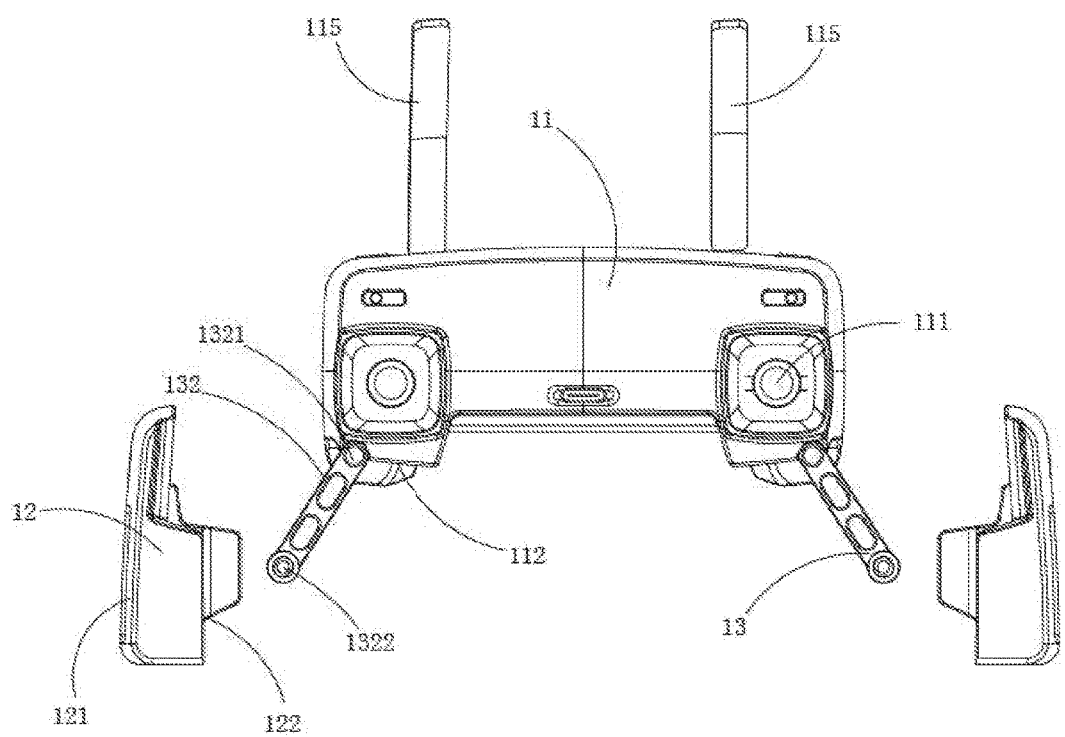
FIG. 7 is an exploded view of the exemplary remote controller in FIG. 6.
Figure 8:
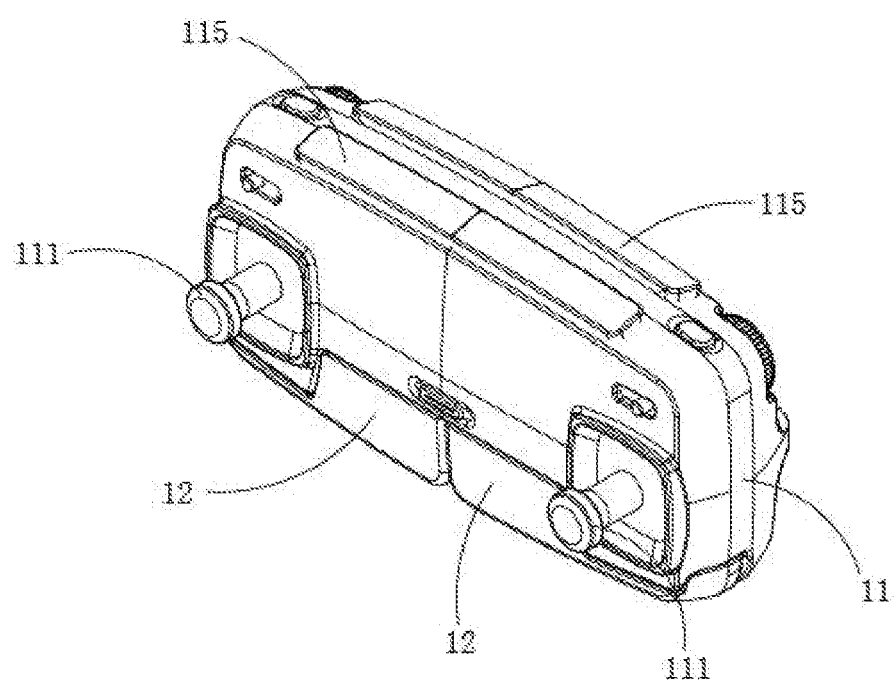
FIG. 8 is a perspective view of the exemplary remote controller in FIG. 6 when a holding mechanism is in a contracted state.
Figure 9:
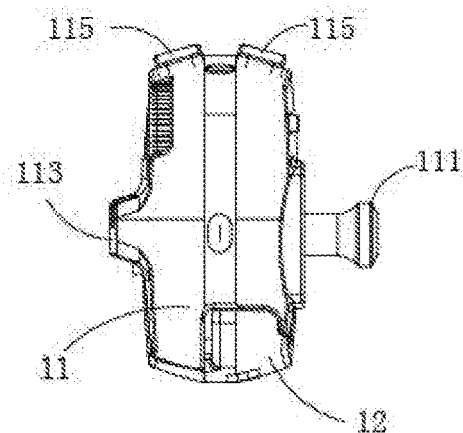
FIG. 9 is a side view of the exemplary remote controller in FIG. 6 when the holding mechanism is in the contracted state.
Figure 10:
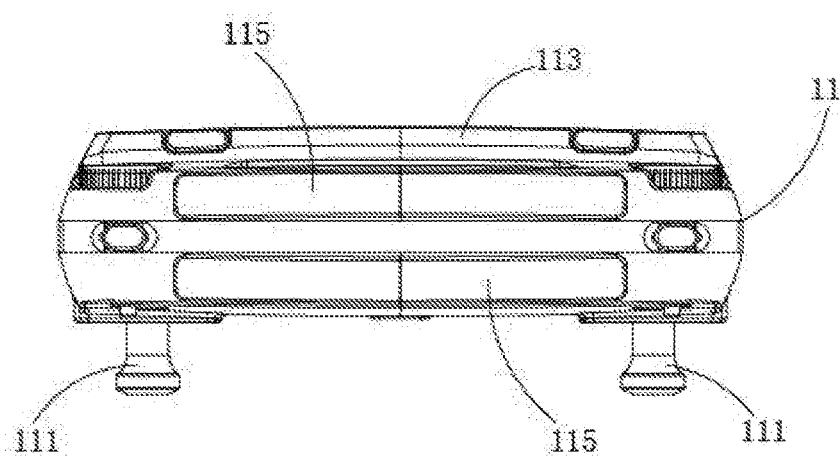
FIG. 10 is a top view of the exemplary remote controller in FIG. 6 when the holding mechanism is in the contracted state.
Figure 11:
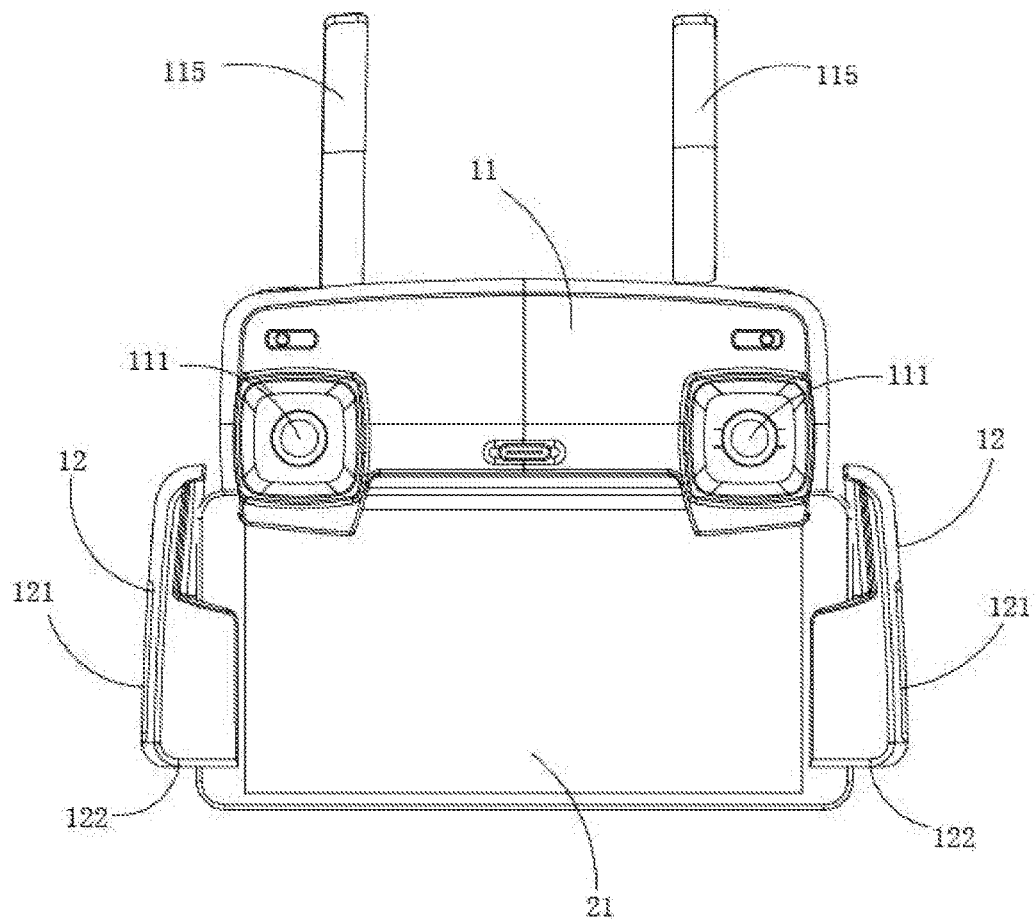
FIG. 11 is a front view of the exemplary remote controller in FIG. 6 when being connected to a mobile terminal.
Figure 12:
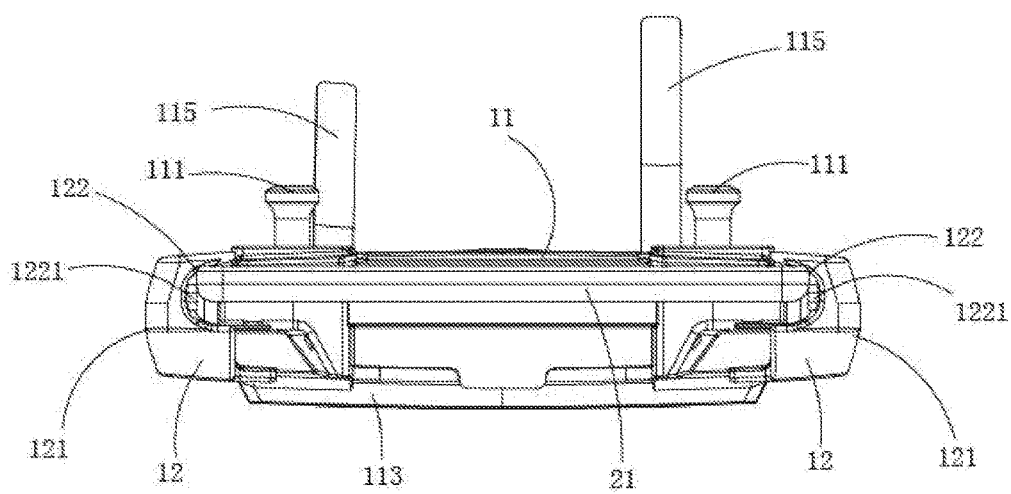
FIG. 12 is a bottom view of the exemplary remote controller in FIG. 6 when being connected to the mobile terminal.
Figure 13:
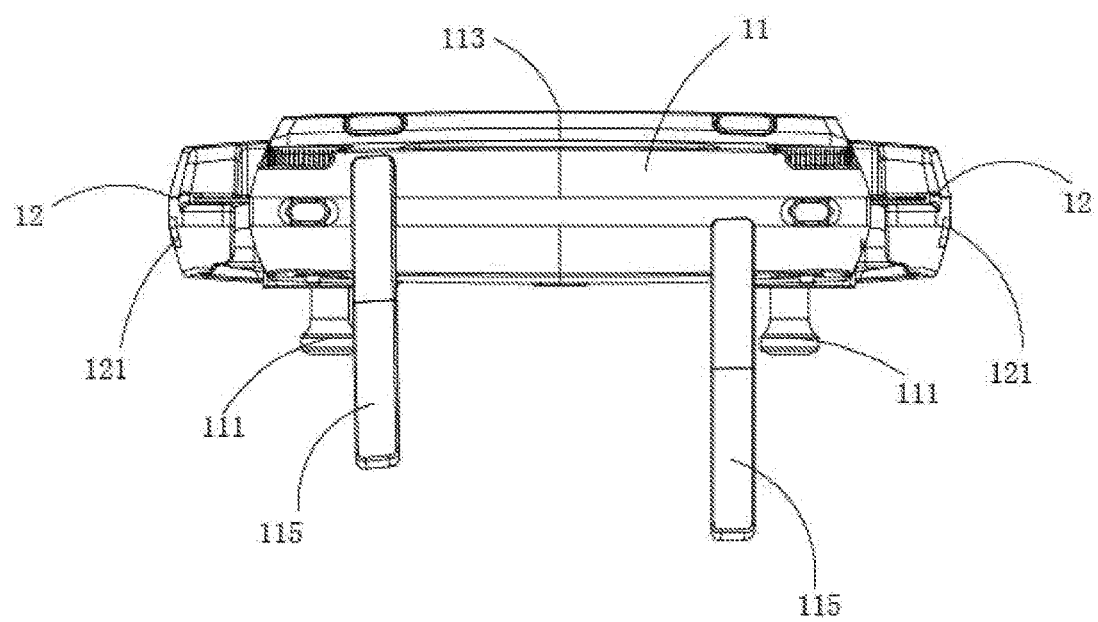
FIG. 13 is a top view of the exemplary remote controller in FIG. 6 when being connected to the mobile terminal.
Figure 14:
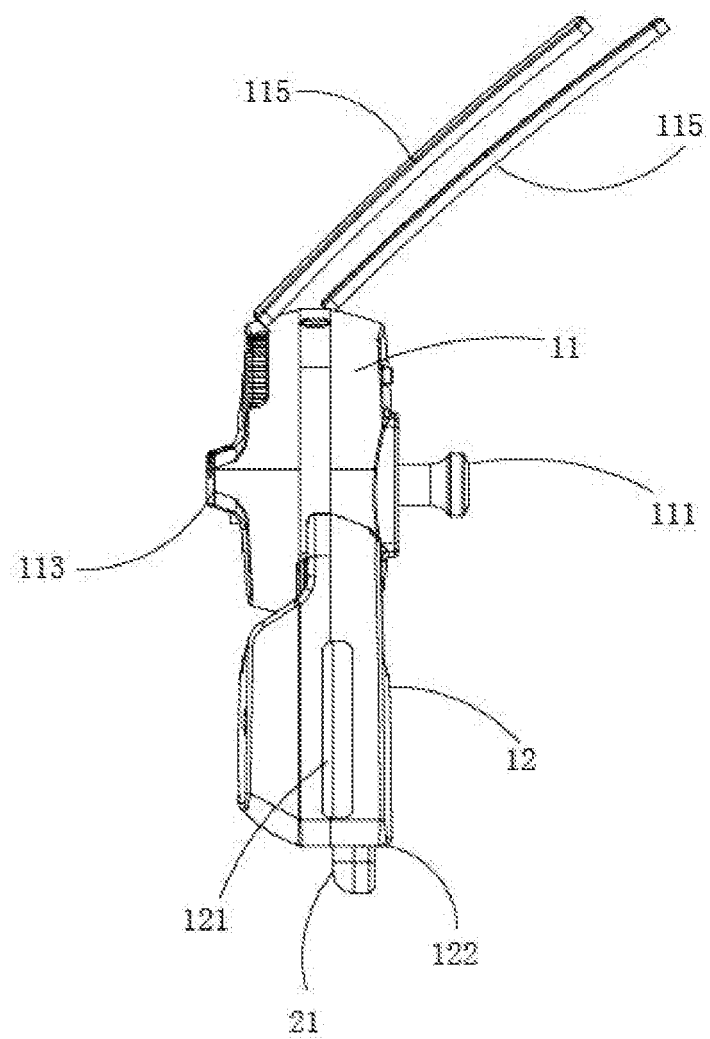
FIG. 14 is a side view of the exemplary remote controller in FIG. 6 when being connected to the mobile terminal.

FIG. 6 is a schematic structural diagram of another exemplary remote controller 200 consistent with the disclosure. FIG. 7 is an exploded view of the remote controller 200. FIG. 8 is a perspective view of the remote controller 200 when the holding mechanism 12 is in a contracted state. FIG. 9 is a side view of the remote controller 200 when the holding mechanism 12 is in the contracted state. FIG. 10 is a top view of the remote controller 200 when the holding mechanism 12 is in the contracted state. FIG. 11 is a front view of the remote controller 200 when being connected to the mobile terminal 21. FIG. 12 is a bottom view of the remote controller 200 when being connected to the mobile terminal 21. FIG. 13 is a top view of the remote controller 200 when being connected to the mobile terminal 21. FIG. 14 is a side view of the remote controller 200 when being connected to the mobile terminal 21.

As shown in FIGS. 6 to 14, the holding mechanism 12 is movably connected to the remote controller body 11 via the connecting mechanism 13. An included angle of the holding mechanism 12 with respect to the remote controller body 11 in the extended state is greater than the included angle of the holding mechanism 12 with respect to the remote controller body 11 in the contracted state. The user can rotate the holding mechanism 12 with respect to the remote controller body 11 to cause the holding mechanism 12 to be in the extended state, such that the mobile terminal 21 can be held on the holding mechanism 12 to facilitate the auxiliary remote-control operation via the mobile terminal 21. After the remote-control operation is completed, the user can detach the mobile terminal 21 from the holding mechanism 12, and rotate the holding mechanism 12 with respect to the remote controller body 11 to cause the holding mechanism 12 to be in the contracted state, thereby facilitating the reduction of the occupied space of the remote controller 200 and improving the portability of the remote controller 200. Therefore, the extend or contract operation of the holding mechanism 12 can be facilitated. Because the included angle of the holding mechanism 12 with respect to the remote controller body 11 in the extended state can be greater than the included angle of the holding mechanism 12 with respect to the remote controller body 11 in the contracted state, the mobile terminal 21 can be easily held on the holding mechanism 12 in the extended state.

As shown in FIGS. 6 to 14, the connecting mechanism 13 includes a rotating rod 132. An end of the rotating rod 132 is rotatably connected to the remote controller body 11 and the other end of the rotating rod 132 is rotatably connected to the holding mechanism 12. As such, by rotating the rotating rod 132 relative to the remote controller body 11 and rotating the holding mechanism 12 relative to the rotating rod 132, the holding mechanism 12 can be extended or contracted. The operation can be simple and the use can be reliable.

In some embodiments, as shown in FIG. 7, a first rotating shaft 1321 is provided at an end of the rotating rod 132 and a second rotating shaft 1322 is provided at the other end of the rotating rod 132. The rotating rod 132 is rotatably connected to the remote controller body 11 via the first rotating shaft 1321. The rotating rod 132 is rotatably connected to the holding mechanism 12 via the second rotating shaft 1322. By rotating the rotating rod 132 about the first rotating shaft 1321 with respect to the remote controller body 11 and rotating the holding mechanism 12 about the second rotating shaft 1322 with respect to the rotating rod 132, the holding mechanism 12 can be extended or contracted. As such, the structure of the connecting mechanism 13 can be simple and the use of the connecting mechanism 13 can be reliable.

In some embodiments, the first rotating shaft 1321 and/or the second rotating shaft 1322 can include a damping shaft. As such, a positioning between the rotating rod 132 and the remote controller body 11, a positioning between the rotating rod 132 and the holding mechanism 12, or a positioning between the holding mechanism 12 and the remote controller body 11 can be conveniently achieved. It will be appreciated by those skilled in the art that the positioning between any two of the rotating rod 132, the remote controller body 11, and the holding mechanism 12 can be achieved by adding another positioning component.

In some embodiments, an axis of the first rotating shaft 1321 can be parallel to an axis of the second rotating shaft 1322. As such, a force perpendicular to the axis of the first rotating shaft 1321 and the axis of the second rotating shaft 1322 can be applied to the holding mechanism 12 to achieve the extend and contract operation of the holding mechanism 12. The operation can be simple and convenient. It will be appreciated by those skilled in the art that the axis of the first shaft 1321 and the axis of the second shaft 1322 can also be perpendicular to each other or form another angle, as long as the extend and contract operation of the holding mechanism 12 can be achieved.

In some embodiments, the control device 111 can include an operating lever. The operating lever can automatically reset to a middle position of an active area of the operating lever. When the operating lever is in the middle position, the first rotating shaft 1321 and the second rotating shaft 1322 are parallel to the operating lever. As such, the holding mechanism 12 can be extended or contracted in a direction perpendicular to the operating lever, such that the holding mechanism 12 in the extended state can be located outside the operating lever, which facilitated an installation of the mobile terminal 21, and the mobile terminal 21 can also be located outside the operating lever, which facilitates the user to operate the operating lever and the mobile terminal 21.

In some embodiments, the holding mechanism 12 can include a clamping component. As shown in FIG. 7, two holding mechanisms 12 are provided. Both of the holding mechanisms 12 are rotatably connected to the remote controller body 11 via two rotating rods 132. As shown in FIG. 11, the two holding mechanisms 12 are configured to clamp two ends of the mobile terminal 21 through the clamping component in the extended state, and cooperate with each other to clamp and position the mobile terminal 21. As such, the reliability of the holding of the mobile terminal 21 by the holding mechanism 12 can be improved.

In some embodiments, the holding mechanism 12 includes a handle 121. The connecting mechanism 13 is connected to the handle 121. The handle 121 can be located outside the remote controller body 11 in the extended state for the user to hold. The handle 121 can increase the size of the remote controller 200 in the use state, which is convenient for the user to hold.

In some embodiments, the handle 121 can abut against an edge of the remote controller body 11 in the contracted state, or can be located at least partially inside the remote controller body 11 in the contracted state. As such, the space occupied by the remote controller 200 can be further reduced, the portability of the remote controller 200 can be improved, and the overall appearance of the remote controller 200 can be enhanced.

Furthermore, when the handle 121 is in the contracted state, it is convenient to hold the remote controller with one hand and perform a one-handed operation, and when the handle 121 is in the extended state, it is convenient for both hands to hold the remote controller and perform a two-handed operation. As such, the handle 121 can be selectively in the contracted state or the extended state, which is convenient for the remote controller 200 to switch between the two-hand operation and the one-handed operation.

In some embodiments, as shown in, e.g., FIG. 11, two handles 121 are provided. The two handles 121 are spaced apart in the extended state, and the mobile terminal 21 is held between the two handles 121. As such, the handles 121 can directly hold the mobile terminal 21 without the need of other connectors, and the structure can be simple and the operation can be convenient.

In some embodiments, as shown in, e.g., FIG. 11, two holding mechanisms 12 are provided. Each of the holding mechanisms 12 is provided with a handle 121. The two holding mechanisms 12 are spaced apart in the extended state, such that a holding space for holding the mobile terminal 21 is formed between the two holding mechanisms 12. Therefore, through holding the mobile terminal 21 by the holding mechanism 12, the stability of the holding of the mobile terminal 21 can be ensured.

In some embodiments, as shown in, e.g., FIG. 12, a slot 122 is provided at the holding mechanism 12. The slot 122 is configured to hold the mobile terminal 21. As such, the stability of the holding of the mobile terminal 21 can be ensured.

In some embodiments, an anti-slip component 1221 is provided at the slot 122. The anti-slip component 1221 is configured to contact with the mobile terminal 21. As such, the anti-slip component 1221 can apply resistance to the mobile terminal 21 and prevent the mobile terminal 21 from slipping.

In some embodiments, as shown in, e.g., FIG. 9, a one-hand grip 113 is provided at a back side of the remote controller body 11. As such, the user can hold the one-hand grip 113 when operating with one hand, thereby improving the stability of holding the remote controller with one hand.

In some embodiments, the one-hand grip 113 can include a bar-shaped protrusion. The bar-shaped protrusion can extend along a length direction of the back side of the remote controller body 11. As such, the one-hand grip 113 can be easily held by the user.

In some embodiments, the holding mechanism 12 can be in contact with an edge of the remote controller body 11 in the contracted state. As such, the space occupied by the remote controller can be reduced and the portability of the remote controller can be improved.

In some embodiments, the control device 111 is provided at the front of the remote controller body 11, and the remote controller body 11 also includes a display screen 114 and/or an operation button at the front of the remote controller body 11. In some embodiments, the display screen 144 can include a touch screen. As such, the user can easily operate the control device 111, the display screen 114, and/or the operation button.

In some embodiments, two control devices 111 are provided. The two control devices 111 are spaced apart along a length direction of the front of the remote controller body 11. The display screen 114 and/or the operation button can be provided between the two control devices 111. As such, the convenience of the user's operation of the control devices 111, the display screen 114, and/or the operation button can be further improved.

In some embodiments, an antenna 115 can be provided at a side of the remote controller body 11. The antenna 115 can be rotatably connected to the remote controller body 11. The antenna 115 can be rotated with respect to the remote controller body 11, such that the antenna 115 can be extended to a use state or folded in a contracted state. Therefore, when the antenna 115 is folded in the contracted state, the space occupied by the remote controller 200 can be reduced and the portability of the remote controller 200 can be improved.

In some embodiments, as shown in FIGS. 6 to 14, two antennas 115 are provided. The two antennas 115 can arranged parallel to each other after being folded. Because the two antennas 115 are parallel to each other after being folded, the occupied space of the remote controller 200 can be further reduced and the portability of the remote controller 200 can be further improved. In some embodiments, the lengths of the two antennas 115 can be the same.

In some embodiments, a receiving groove can be provided at a side of the remote controller body 11. The two antennas 115 can be received in the receiving groove after being folded. As such, the space occupied by the remote controller 200 can be further reduced, and the portability of the remote controller 200 can be improved.

In some embodiments, the two antennas 115 can touch a side of the remote controller body 11. As such, the space occupied by the remote controller 200 can be further reduced, and the portability of the remote controller 200 can be improved.

Figure 15:
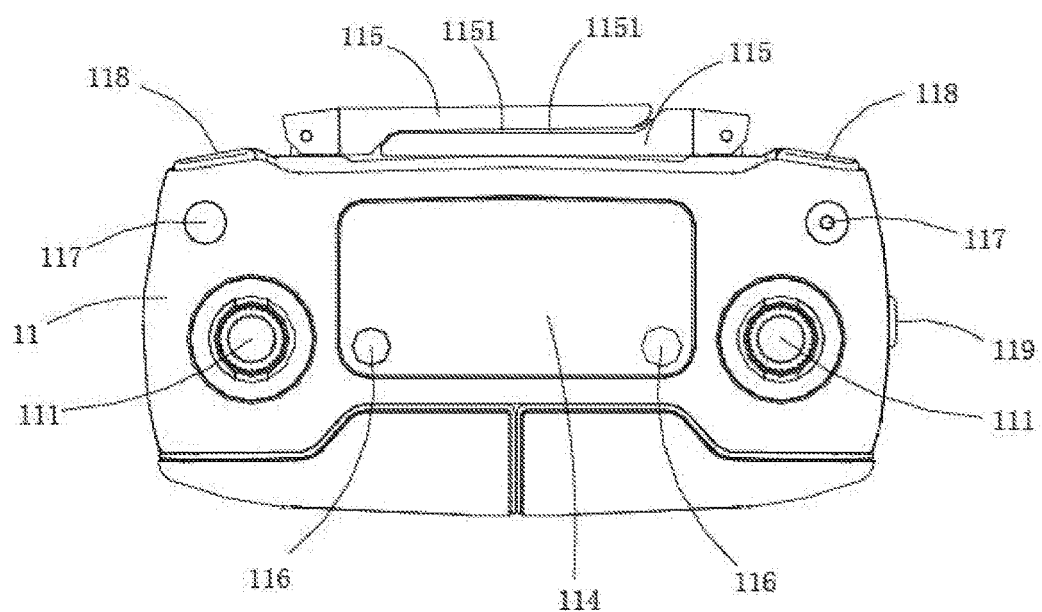
FIG. 15 is a schematic structural diagram of another exemplary remote controller when one or more antennas are in a contracted state.
Figure 16:
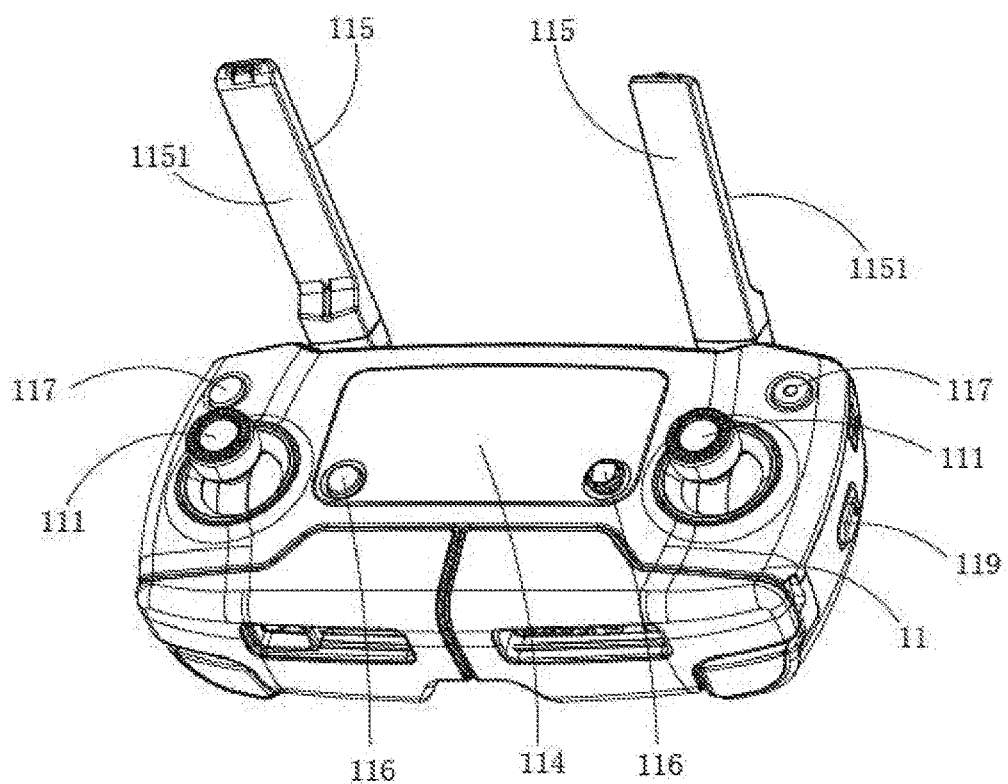
FIG. 16 is a schematic structural diagram of the exemplary remote controller in FIG. 15 when the one or more antennas are in a use state.
Figure 17:
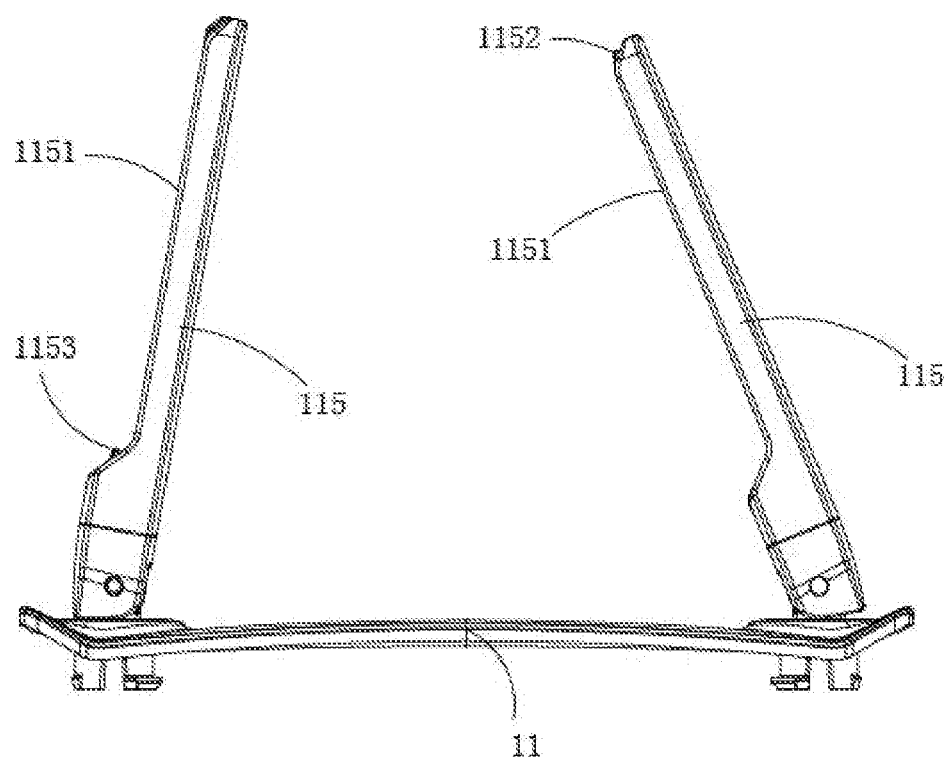
FIG. 17 is a schematic structural diagram of another exemplary remote controller when one or more antennas are in a use state.
Figure 18:
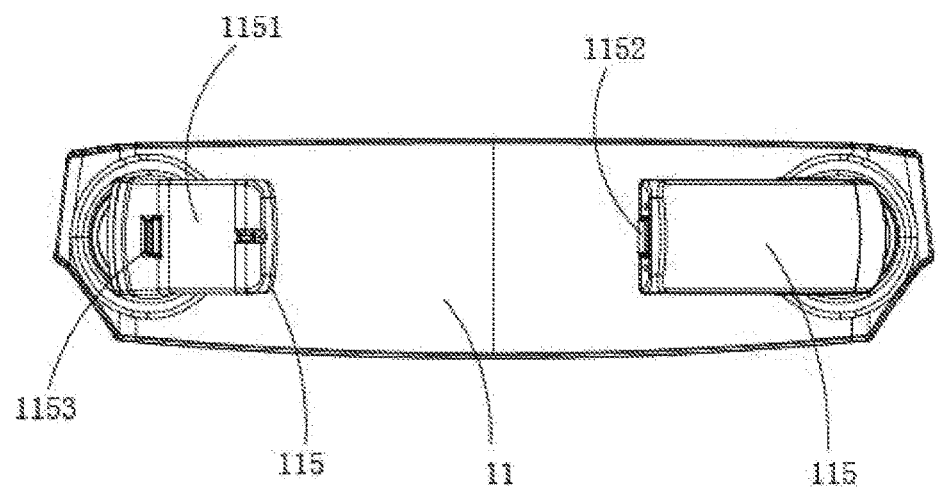
FIG. 18 is a top view of the exemplary remote controller in FIG. 17 when the one or more antennas are in the use state.
Figure 19:
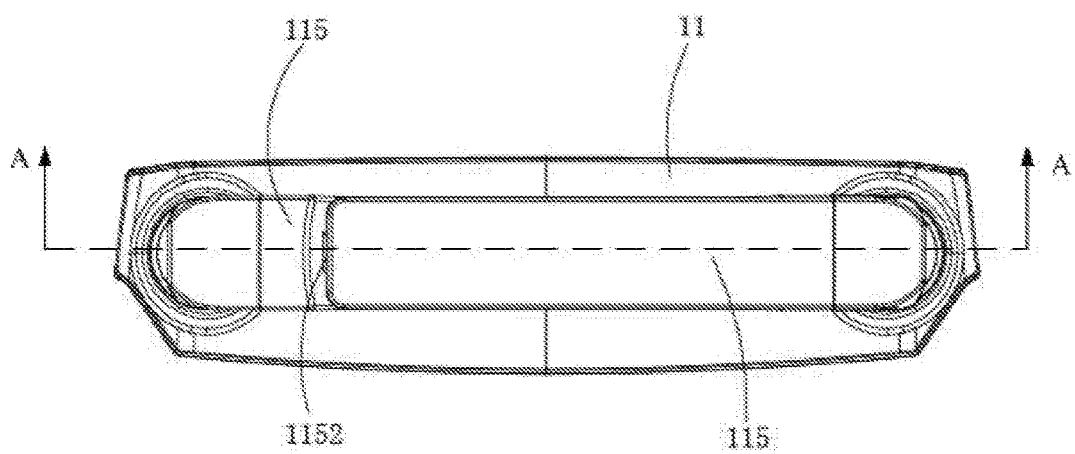
FIG. 19 is a schematic partial structural diagram of the remote controller in FIG. 17 when the one or more antennas are in a contracted state.
Figure 20:
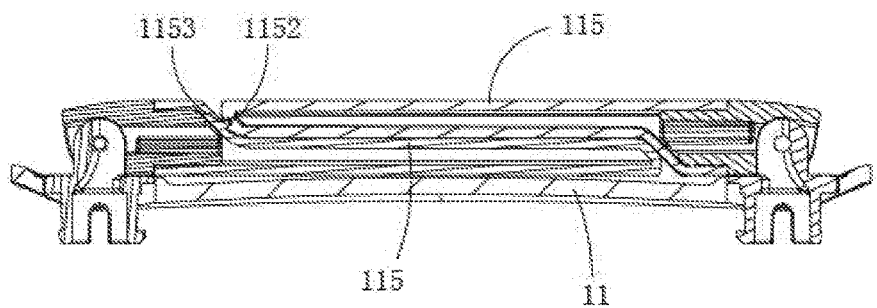
FIG. 20 is a cross-sectional view along line A-A of the remote controller in FIG. 19.

FIG. 15 is a schematic structural diagram of another exemplary remote controller 300 when one or more antennas 115 are in a contracted state. FIG. 16 is a schematic structural diagram of the remote controller 300 when the one or more antennas 115 are in a use state. FIG. 17 is a schematic structural diagram of another exemplary remote controller 400 when one or more antennas 115 are in the use state. FIG. 18 is a top view of the remote controller 400 when the one or more antennas 115 are in the use state. FIG. 19 is a schematic partial structural diagram of the remote controller 400 when the one or more antennas are in a contracted state. FIG. 20 is a cross-sectional view along line A-A of the remote controller 400.

As shown in FIGS. 15 to 20, in some embodiments, two antennas 115 are provided. The two antennas 115 are stacked after being folded. As such, the space occupied by the remote controller can be further reduced, and the portability of the remote controller can be improved.

In some embodiments, each of the two antennas 115 includes an anti-collision groove 1151 in a thickness direction. The two anti-collision grooves 1151 of the two antennas 115 are overlapped after being folded, such that the stacked thickness of the two antennas 115 after being folded is substantially equal to the maximum thickness of the single antenna 115. As such, the space occupied by the remote controller can be further reduced and the portability of the remote controller can be improved. For example, the thickness difference between the stacked thickness of the two antennas 115 after being folded and the maximum thickness of the single antenna 115 is less than or equal to about 5 mm.

In some embodiments, an engaging component 1152 is provided at one of the two antennas 115, and a mating component 1153 is provided at the other one of the two antennas 115. The engaging component 1152 can be engaged with the mating component 1153 after the two antennas 115 are folded, such that the two antennas 115 can be positioned after being folded. As such, the stability of the folded antennas 115 can be improved, and the antennas 115 can be prevented from rotating with respect to the remote controller body 11 under an external force.

In some embodiments, an end of each of the two antennas 115 can be rotatably connected to the remote controller body 11 through a universal connector or a rotating shaft. As such, the two antennas 115 can be rotated in multiple directions, and the antenna 115 can be easily extended and folded.

In some embodiments, as shown in, e.g., FIG. 16, the two antennas 115 have a flat structure. When the two antennas 115 are in the use state, the thickness directions of the two antennas 115 are directed toward the user. As such, the two antennas 115 can be more beautiful in the use state, and the occupied space of the remote controller in the contracted state can be further reduced, and the portability of the remote controller can be improved.

In some embodiments, as shown in, e.g., FIGS. 17 and 18, the two antennas 115 are curved in the length direction. Curved shapes are the same as the shape of a side of the remote controller body 11 close to the two antennas 115, such that the two antennas 115 can be closely attached to the side of the remote controller body 11. As such, the occupied space of the remote controller in the contracted state can be further reduced, and the portability of the remote controller can be improved.

In some embodiments, as shown in FIGS. 15 and 16, the two antennas 115 are switched from the contracted state to the use state after being rotated a preset angle. The preset angle can be set according to actual conditions, thereby facilitating the extend and fold operation of the two antennas 115.

In some embodiments, the preset angle can be greater than 60 degrees and less than 120 degrees. As such, the extend and fold operation of the two antennas 115 can be facilitated.

In some embodiments, the control device 111 is located at the front of the remote controller body 11. The control device 111 is configured to control a movement direction of a remotely-controlled mobile platform. As such, the user can easily operate the control device 111.

In some embodiments, two control devices 111 are provided. The two control devices 111 are spaced apart. As such, the user can easily perform two-handed operation on the control devices 111.

As shown in FIGS. 15 and 16, in some embodiments, the remote controller body 11 includes a middle function button 116 at the front of the remote controller body 11. The middle function button 116 is located between the two control devices 111. As such, the user can easily operate the control devices 111 and the middle function button 116.

In some embodiments, the middle function button 116 can include an emergency stop button configured to stop the movement of the remotely-controlled mobile platform. As such, when the remotely-controlled mobile platform encounters an obstacle during the movement, the user can control the remotely-controlled mobile platform to change from a motion state to a stop state via the middle function button 116, thereby preventing the remotely-controlled mobile platform from colliding with the obstacle.

In some embodiments, the emergency stop button can be located in a left side area of the front of the remote controller body 11. Thus, the user can easily operate the emergency stop key with his left hand.

In some embodiments, the middle function button 116 can include a custom function button. The user can set the function of the custom function button according to their own needs, thereby facilitating the operation.

In some embodiments, the custom function key can be located in a right side area of the front of the remote controller body 11. Therefore, the user can easily operate the custom function button with his right hand.

In some embodiments, two middle function buttons are included. The two middle function-buttons 116 are spaced apart along the length direction of the front of the remote controller body 11.

In some embodiments, the remote control body 11 includes an upper function button 117 at an upper side of the remote control body 11. The upper function button 117 is located above the control device 111. As such, the user can easily operate the control device 111 and the upper function button 117.

In some embodiments, the upper function button 117 can include a return button configured to return the remotely-controlled mobile platform to a preset position. As such, the remotely-controlled mobile platform can be conveniently returned to the preset position, thereby facilitating the recycling of the remotely-controlled mobile platform.

In some embodiments, the return button can be located in the left side area of the front of the remote controller body 11. As such, the user can easily operate the return button with his left hand.

In some embodiments, the upper function button 117 can include a power switch key configured to control power on and off of the remote controller. As such, the power on and off of the remote controller can be easily controlled via the power switch key.

In some embodiments, the power switch key can be located in the right side area of the front of the remote controller body 11. As such, the user can easily operate the power switch key with his right hand.

In some embodiments, two upper function buttons 117 are included. The two upper function buttons 117 are spaced apart along the length direction of the front of the remote controller body 11.

In some embodiments, the remote controller body 11 includes an upper-edge function button 118 at the upper side of the remote controller body 11. As such, the user can easily operate the upper-edge function button 117.

In some embodiments, the upper-edge function button 118 can include a video button configured to control a camera of the remotely-controlled mobile platform to record video. As such, the camera of the remotely-controlled mobile platform can be conveniently controlled for recording.

In some embodiments, the video button can be located in a left side area of the upper side of the remote controller body 11. As such, the user can easily operate the video button with the left hand.

In some embodiments, the upper-edge function button 118 can include a photographing button configured to control the camera of the remotely-controlled mobile platform to shoot an image. As such, the camera of the remotely-controlled mobile platform can be conveniently controlled for shooting pictures.

In some embodiments, the photographing button can be located in a right side area of the upper side of the remote controller body 11. As such, the user can easily operate the photographing button with his right hand.

In some embodiments, two upper-edge function button 118 are included. The two upper-edge function buttons 118 are spaced apart along a length direction of the upper side of the remote controller body 11.

In some embodiments, the remote controller body 11 includes a lock button 119 and is configured to control the remote controller to enter a locked state. As such, the remote controller can be easily controlled to enter the locked state and can be prevented from misoperations.

In some embodiments, the remote controller body 11 can include the lock button 119 at a right side of the remote controller body 11. As such, the user can easily operate the lock button 119 with the right hand.

In some embodiments, the lock button 119 can include a push button, a touch button, a toggle switch, or a spin button. As such, the user can easily operate the lock button 119.

In some embodiments, the remote-controlled mobile platform can include an unmanned aerial vehicle (UAV). Thus, the user can control the UAV using the remote controller. In some other embodiments, the remotely-controlled mobile platform can also be a remote control car or a remote control ship.

A manufacturing method of the remote controller consistent with the disclosure is provided. The manufacturing method includes that the one or more holding mechanisms 12 are movably connected to the remote controller body 11 via the connecting mechanism 13, and the one or more holding mechanisms 12 can move with respect to the remote controller body 11, such that the one or more holding mechanisms 12 can be either in an extended state for holding the mobile terminal 21 or in a contracted state for easily carrying the remote controller.

In the embodiments, the user can move the one or more holding mechanisms 12 with respect to the remote controller body 11 to cause the one or more holding mechanisms 12 to be in the extended state, such that the mobile terminal 21 can be held on the one or more holding mechanisms 12 to facilitate an auxiliary remote-control operation via the mobile terminal 21. After the remote-control operation is completed, the user can detach the mobile terminal 21 from the one or more holding mechanisms 12, and move the one or more holding mechanisms 12 with respect to the remote controller body 11 to cause the one or more holding mechanisms 12 to be in the contracted state, thereby facilitating the reduction of the occupied space of the remote controller and improving the portability of the remote controller.

In some embodiments, the one or more holding mechanisms 12 can be rotatably connected to the remote controller body 11 via the connecting mechanism 13. The one or more holding mechanisms 12 can rotate with respect to the remote controller body 11, such that the one or more holding mechanisms 12 can be either in the extended state for holding the mobile terminal 21, or in the contracted state that is convenient for carrying the remote controller.

In the embodiments, the user can rotate the one or more holding mechanisms 12 with respect to the remote controller body 11 to cause the one or more holding mechanisms 12 to be in the extended state, such that the mobile terminal 21 can be held on the one or more holding mechanisms 12 to facilitate an auxiliary remote-control operation via the mobile terminal 21. After the remote-control operation is completed, the user can detach the mobile terminal 21 from the one or more holding mechanisms 12, and move the one or more holding mechanisms 12 with respect to the remote controller body 11 to cause the one or more holding mechanisms 12 to be in the contracted state, thereby facilitating the reduction of the occupied space of the remote controller and improving the portability of the remote controller.

In some embodiments, the one or more holding mechanisms 12 can be slidably connected to the remote controller body 11 via the connecting mechanism 13. The one or more holding mechanisms 12 can slide with respect to the remote controller body 11, such that the one or more holding mechanisms 12 is either in the extended state for holding the mobile terminal 21, or in the contracted state for easily carrying the remote controller.

In the embodiments, the user can slide the one or more holding mechanisms 12 with respect to the remote controller body 11 to cause the one or more holding mechanisms 12 to be in the extended state, such that the mobile terminal 21 can be held on the one or more holding mechanisms 12 to facilitate the auxiliary remote-control operation via the mobile terminal 21. After the remote-control operation is completed, the user can detach the mobile terminal 21 from the one or more holding mechanisms 12, and slide the one or more holding mechanisms 12 with respect to the remote controller body 11 to cause the one or more holding mechanisms 12 to be in the contracted state, thereby facilitating the reduction of the occupied space of the remote controller and improving the portability of the remote controller. Therefore, the extend or contract operation of the one or more holding mechanisms 12 can be facilitated.

In some embodiments, a receiving component 112 can be provided at the remote controller body 11, after which the one or more holding mechanisms 12 can be movably connected to the remote controller body 11 via the connecting mechanism 13. The one or more holding mechanisms 12 can move with respect to the remote controller body 11, such that the one or more holding mechanisms 12 can be either in an extended state for holding the mobile terminal 21, or in a contracted state for easily carrying the remote controller, and the one or more holding mechanism 12 can be located at least partially inside the receiving component 112 in the contracted state.

Because the one or more holding mechanisms 12 can be located at least partially inside the receiving component 112 in the contracted state, the space occupied by the remote controller can be further reduced, and the portability of the remote controller can be improved.

In some embodiments, after the processes described above, one or more handles 121 can be provided at the one or more holding mechanisms 12. The connecting mechanism 13 can be connected to the one or more handles 121. The one or more handles 121 can be located outside the remote controller body 11 in the extended state for the user to hold.

The one or more handles 121 can increase the size of the remote controller in the use state, which is convenient for the user to hold.

It is intended that the embodiments be considered as exemplary only and not to limit the scope of the disclosure. Those skilled in the art will be appreciated that any modification or equivalents to the disclosed embodiments are intended to be encompassed within the scope of the present disclosure.

What is claimed is:

1. A remote controller comprising:
  a remote controller body including one or more control devices;
  a holding mechanism configured to move with respect to the remote controller body to switch between an extended state and a contracted state;
  a connecting mechanism movably connecting the holding mechanism to the remote controller body; and
  a first antenna and a second antenna provided at a side of the remote controller body and rotatably connected to the remote controller body to be extended or folded;
  wherein:
    the holding mechanism includes a handle connected to the connecting mechanism, the handle being located outside the remote controller body in the extended state;
    the first antenna and the second antenna are stacked when folded;
    each of the first antenna and the second antenna includes an anti-collision groove in a thickness direction; and
    the anti-collision grooves of the first antenna and the second antenna overlap with each other when the first antenna and the second antenna are folded to cause a stacked thickness of the first antenna and the second antenna to be equal to a maximum thickness of one of the first antenna and the second antenna; and
    the remote controller is configured to control an unmanned aerial vehicle (UAV).

2. The remote controller of claim 1, wherein:
  the holding mechanism is rotatably connected to the remote controller body via the connecting mechanism; and
  an included angle of the holding mechanism with respect to the remote controller body is greater in the extended state than in the contracted state.

3. The remote controller of claim 1, wherein:
  the remote controller body includes a front and a plurality of sides connected to the front, the plurality of sides including a bottom side;
  the one or more control devices are provided at the front of the remote controller body; and
  the holding mechanism is configured to hold the mobile terminal at a position close to the bottom side.

4. The remote controller of claim 3, wherein:
  the holding mechanism is configured to abut against the bottom side in the contracted state.

5. The remote controller of claim 1, wherein:
  the remote controller body includes a receiving component; and
  the holding mechanism is provided at least partially inside the receiving component in the contracted state.

6. The remote controller of claim 1, wherein the handle abuts against an edge of the remote controller body in the contracted state.

7. The remote controller of claim 1,
  wherein the holding mechanism is a first holding mechanism;
  the remote controller further comprising:
    a second holding mechanism configured to move with respect to the remote controller body to switch between the extended state and the contract state, the first holding mechanism and the second holding mechanism being spaced apart from each other in the extended state.

8. The remote controller of claim 7, wherein:
  the handle is a first handle;
  the second holding mechanism includes a second handle connected to the connecting mechanism and located outside the remote controller body in the extended state; and
  the first handle and the second handle are spaced apart from each other in the extended state.

9. The remote controller of claim 1, wherein the holding mechanism is configured to contact an edge of the remote controller body in the contracted state.

10. The remote controller of claim 1, wherein:
  the one or more control devices are provided at a front of the remote controller body; and
  the remote controller body further includes a display screen and/or an operation button on the front of the remote controller body.

11. The remote controller of claim 10, wherein:
  the one or more control devices include two control devices spaced apart along a length direction of the front of the remote controller body; and
  the display screen and/or the operation button is provided between the two control devices.

12. The remote controller of claim 1, wherein the first antenna and the second antenna are parallel to each other when folded.

13. The remote controller of claim 1, wherein:
  an end of the first antenna is rotatably connected to the remote controller body through a universal connector or a rotating shaft.

14. The remote controller of claim 1, wherein:
the first antenna has a flat structure; and
the thickness direction of the first antenna in a use state is directed toward a user.

15. The remote controller of claim 14, wherein:
the first antenna is switched to the use state in response to being rotated a preset angle.

16. The remote controller of claim 15, wherein:
the preset angle is greater than 60 degrees and less than 120 degrees.

17. The remote controller of claim 1, wherein the one or more control devices are located on a front of the remote controller body and configured to control a movement direction of a remotely-controlled mobile platform.

18. The remote controller of claim 17, wherein the one or more control devices include two control devices spaced apart from each other.

19. The remote controller of claim 18, wherein the remote controller body further includes a middle function button at the front of the remote controller body and located between the two control devices.

20. The remote controller of claim 19, wherein the middle function button includes an emergency stop button configured to stop a movement of the remotely-controlled mobile platform.

21. The remote controller of claim 18, wherein the remote controller body further includes an upper function button above the two control devices.

22. The remote controller of claim 21, wherein the upper function button includes a power switch key configured to control power on and off of the remote controller.

23. The remote controller of claim 22, wherein the power switch key is located in a right side area of the front of the remote controller body.

24. The remote controller of claim 21, wherein the upper function button includes a return button configured to return the remotely-controlled mobile platform to a preset location.

25. The remote controller of claim 17, wherein the remote controller body further includes an upper-edge function button at an upper side of the remote controller body.

26. The remote controller of claim 25, wherein the upper-edge function button includes a video button configured to control a camera of the remotely-controlled mobile platform to record video.

27. The remote controller of claim 25, wherein the upper-edge function button includes a photographing button configured to control a camera of the remotely-controlled mobile platform to shoot an image.

* * * * *